(12) United States Patent
Lee

(10) Patent No.: US 8,757,862 B2
(45) Date of Patent: Jun. 24, 2014

(54) BACKLIGHT MODULE AND ASSEMBLING METHOD THEREOF

(75) Inventor: Keng-Yi Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 79 days.

(21) Appl. No.: 13/445,077

(22) Filed: Apr. 12, 2012

(65) Prior Publication Data

US 2013/0128617 A1    May 23, 2013

(30) Foreign Application Priority Data

Nov. 17, 2011 (TW) .............................. 100142060 A

(51) Int. Cl.
| F21V 7/04 | (2006.01) |
| F21V 17/10 | (2006.01) |
| F21V 13/02 | (2006.01) |
| F21S 8/00 | (2006.01) |

(52) U.S. Cl.
CPC ................. *F21S 8/00* (2013.01); *G02B 6/0068* (2013.01); *G02B 6/0023* (2013.01); *G02B 6/0091* (2013.01); *F21V 17/10* (2013.01); *F21V 13/02* (2013.01)
USPC .............. 362/634; 362/231; 362/633; 349/58

(58) Field of Classification Search
USPC ............ 362/230, 231, 249.02, 561, 600–615, 362/622, 632, 634, 800, 812; 349/56–58, 349/61, 62, 65, 67
See application file for complete search history.

(56) References Cited

U.S. PATENT DOCUMENTS

| 7,481,562 B2 | 1/2009 | Chua et al. | |
| 2006/0002141 A1* | 1/2006 | Ouderkirk et al. ............ | 362/609 |
| 2006/0072339 A1* | 4/2006 | Li et al. ......................... | 362/608 |
| 2010/0163898 A1 | 7/2010 | Hung et al. | |
| 2011/0141769 A1 | 6/2011 | Lee et al. | |
| 2012/0127752 A1* | 5/2012 | Jung ............................. | 362/602 |
| 2012/0163023 A1* | 6/2012 | Kim et al. ..................... | 362/611 |
| 2012/0281151 A1 | 11/2012 | Abe | |

FOREIGN PATENT DOCUMENTS

| TW | 200720781 | 6/2007 |
| TW | 200821697 | 5/2008 |
| TW | M345259 | 11/2008 |
| WO | 2011093121 | 4/2011 |

\* cited by examiner

*Primary Examiner* — Hargobind S Sawhney
(74) *Attorney, Agent, or Firm* — WPAT, PC; Justin King

(57) ABSTRACT

A backlight module includes a light guide plate, at least one light emitter, and a wavelength converter. The light guide plate has an incident surface. The light emitter is disposed at a side of the light guide plate and corresponds in position to the incident surface. The light emitter includes a base and a light source. The base includes a clamping arm. The clamping arm substantially extends toward the light guide plate. The light source is disposed on the base. The wavelength converter is located between the light guide plate and the light source and is clamped by the clamping arm.

11 Claims, 5 Drawing Sheets

BACKLIGHT MODULE AND ASSEMBLING METHOD THEREOF

RELATED APPLICATIONS

This application claims priority to Taiwan Application Serial Number 100142060, filed Nov. 17, 2011, which is herein incorporated by reference.

BACKGROUND

1. Field of Invention

The present invention relates to a backlight module.

2. Description of Related Art

In recent years, owing to the rapid development of the electronics and information industries, products developed by these industries are becoming increasingly sophisticated. For current personal computers, in addition to efforts to realize faster and more powerful computing units and to offer a wide range of peripheral equipment to meet user needs, a key area of development in the computer industry relates to realizing a more compact size, lighter weight, and thinner profile for personal computers.

Liquid crystal displays have the advantages of high definition, small size, lightweight, low driving voltage, and low power consumption. Moreover, liquid crystal displays can be used in a wide range of applications, such as in portable televisions, mobile phones, camcorders, notebook computers, desktop monitors, and other consumer electronics products, and as a result, have become the most commonly used display configuration.

In addition, quantum dot displays are a popular and rapidly developing light-emitting technology. The principals of operation of the quantum dot display are different from those of liquid crystal displays and earlier cathode ray tube displays. Quantum dots are tiny nanocrystals and can be stimulated by electricity or light to emit different colors of light depending on the structure or size thereof. The larger the size of a quantum dot, the more is its tendency to emit blue light when stimulated, whereas the smaller the size of a quantum dot, the more is its tendency to emit red light when stimulated. Compared with the liquid crystal display and the cathode ray tube display, the quantum dot display can generate light with a higher efficiency, so as to save energy.

However, a traditional mounting method of the glass capillary for packaging nanocrystals of the quantum dot display involves adhering the glass capillary between a side of a light guide plate and a base of a light emitter of the quantum dot display using a LOCA (Liquid Optically Clear Adhesive). Because the LOCA is a liquid and therefore has a certain degree of fluidity, overflowing of the LOCA may occur to thereby adversely affect the optical performance and assembly of the quantum dot display.

SUMMARY

In order to solve the problems of the prior art, the invention provides an improved backlight module, in which a light emitter includes a particularly designed clamping arm formed on a base thereof. The clamping arm of the base can be used to clamp a wavelength converter, so the light emitter and the wavelength converter can be mounted to each other without the use of an adhesive (e.g., a LOCA) to thereby solve the problem of overflowing of the adhesive. In addition, when the wavelength converter is adhered to a side of a light guide plate of the backlight module by using a LOCA, the LOCA also adheres to the clamping arm that clamps the wavelength converter, so as to enhance the mounting strength between the wavelength converter and the light guide plate. Furthermore, engaging structures are respectively disposed on the clamping arm of the base and the light guide plate, so the LOCA between the wavelength converter and the light guide plate can be blocked by the clamping arm when the base of the light emitter abuts against the light guide plate, so as to prevent the LOCA from overflowing onto the upper surface and the lower surface of the light guide plate.

According to an embodiment of the invention, a backlight module includes a light guide plate, at least one light emitter, and a wavelength converter. The light guide plate has an incident surface. The light emitter is disposed at a side of the light guide plate and corresponds in position to the incident surface. The light emitter includes a base and a light source. The base includes a clamping arm that substantially extends toward the light guide plate. The light source is disposed on the base. The wavelength converter is located between the light guide plate and the light source and is clamped by the clamping arm.

In an embodiment of the invention, the wavelength converter has an exit surface that faces the incident surface. The clamping arm includes an abutting portion and a hook portion. The abutting portion substantially extends toward the light guide plate for abutting against a sidewall of the wavelength converter. The hook portion is connected to the abutting portion and extends toward a location between the wavelength converter and the light guide plate. The inner side of the hook portion hooks onto the exit surface.

In an embodiment of the invention, the light guide plate further includes an engaging portion located at the edge of the incident surface. The engaging portion abuts against the outer side of the hook portion.

In an embodiment of the invention, the hook portion includes a guiding surface. The guiding surface has a slope substantially inclined outward in a direction away from the base. The engaging portion includes an inclined surface. The guiding surface and the inclined surface abut against each other.

In an embodiment of the invention, the backlight module further includes an adhesive. The adhesive is applied to the exit surface, the light guide plate, and the hook portion.

In an embodiment of the invention, the light emitter is disposed at a corner of the light guide plate.

In an embodiment of the invention, the wavelength converter is substantially strip-shaped. The boundary of the wavelength converter is substantially aligned to the boundary of the incident surface in a direction perpendicular to the incident surface. A plurality of the light emitters are disposed along the wavelength converter in a spaced-apart manner, so that the wavelength converter is located between the incident surface and any one of the light emitters.

In an embodiment of the invention, a wavelength converting material is packaged in the wavelength converter, and the wavelength converting material has nanocrystals included therein.

In an embodiment of the invention, the light emitter emits blue light.

The invention further provides an improved backlight module assembling method.

According to an embodiment of the invention, the backlight module assembling method includes a number of steps. In a first step, a light emitter is provided, in which the light emitter includes a base and a light source. The base includes a clamping arm, and the light source is disposed on the base. Subsequently, a wavelength converter is assembled on the base, so as to make the clamping arm clamp the wavelength converter. Next, a light guide plate is assembled to the clamping arm, so that the wavelength converter is located between the light guide plate and the light source.

In an embodiment of the invention, the clamping arm includes an abutting portion and a hook portion. The abutting portion is connected between the base and the hook portion. The step of assembling the wavelength converter toward the base further includes a number of steps. First, the wavelength converter is pushed onto the hook portion, so as to make the abutting portion deform outwardly in a direction away from the light source. Next, the wavelength converter is pushed to pass over the hook portion, so that the abutting portion is allowed to return to its original position and thereby abut against the sidewall of the wavelength converter, and also so that the inner side of the hook portion hooks onto an exit surface of the wavelength converter that faces away from the light source.

In an embodiment of the invention, the hook portion hooks onto the edge of the exit surface. The hook portion includes a guiding surface. The guiding surface has a slope substantially inclined outward in a direction away from the base. The light guide plate further includes an incident surface and an engaging portion. The engaging portion is located at the edge of the incident surface. The engaging portion includes an inclined surface. The step of assembling the light guide plate to the clamping arm includes a step of abutting the engaging portion against the outer side of the hook portion, so as to make the guiding surface and the inclined surface abut against each other.

In an embodiment of the invention, the step of assembling the light guide plate to the clamping arm further includes a number of steps. Initially, an adhesive is applied between the exit surface and the hook portion. Next, the light guide plate is assembled on the hook portion, so that an incident surface of the light guide plate contacts the adhesive. The adhesive is subsequently permitted to harden, so as to adhere the light guide plate to the exit surface and the hook portion.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
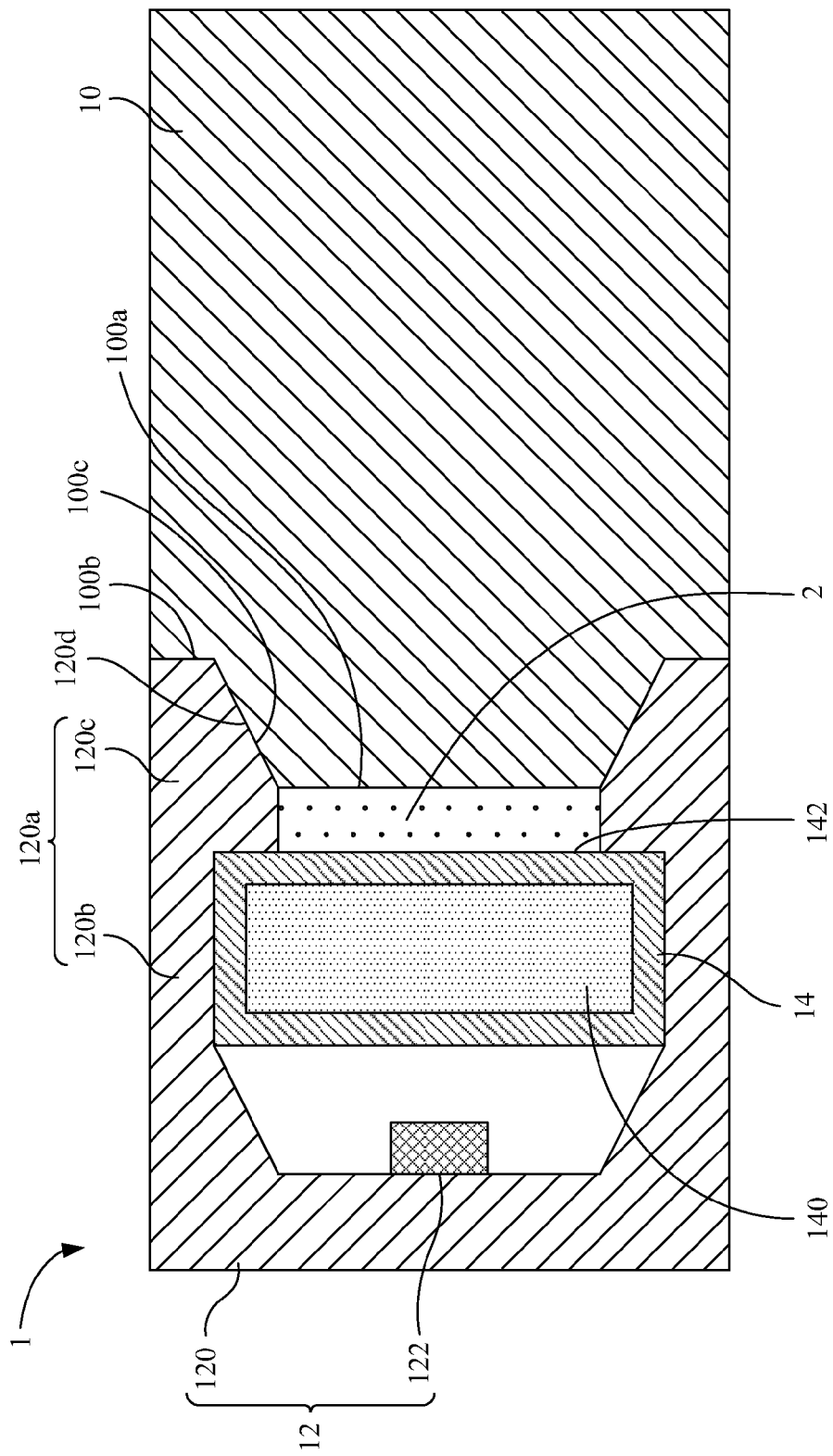
FIG. 1 is a partial side view of some components of a backlight module according to an embodiment of the invention, in which a base of a light emitter is shown in sectional view.

Reference will now be made in detail to the present embodiments of the invention, examples of which are illustrated in the accompanying drawings. Wherever possible, the same reference numbers are used in the drawings and the description to refer to the same or like parts.

An improved backlight module is provided. Specifically, a light emitter of the backlight module includes a particularly designed clamping arm formed on a base thereof. The clamping arm of the base can be used to clamp a wavelength converter, so the light emitter and the wavelength converter can be mounted to each other without the use of an adhesive (e.g., a LOCA) to thereby solve the problem of overflowing of the adhesive. In addition, when the wavelength converter is adhered to a side of a light guide plate of the backlight module by using a LOCA, the LOCA also adheres to the clamping arm that clamps the wavelength converter, so as to enhance the mounting strength between the wavelength converter and the light guide plate. Furthermore, engaging structures are respectively disposed on the clamping arm of the base and the light guide plate, so the LOCA between the wavelength converter and the light guide plate can be blocked by the clamping arm when the base of the light emitter abuts against the light guide plate, so as to prevent the LOCA from overflowing onto the upper surface and the lower surface of the light guide plate.

FIG. 1 is a partial side view of some components of a backlight module 1 according to an embodiment of the invention, in which a base 120 of a light emitter 12 is shown in sectional view.

An electronic apparatus that applies the backlight module 1 of the invention can be a portable computer device (e.g., a notebook computer, a tablet computer, etc.) or a portable electronic product (e.g., a PDA, a mobile phone, a game console, etc.), but the invention is not limited in this regard. That is, the electronic apparatus that applies the backlight module 1 of the invention can be any electronic product that has a display function. As long as there is a requirement to prevent an adhesive from overflowing and thereby adversely affect the optical performance and the assembly of the backlight module 1, the concepts of the invention can be applied to design the backlight module 1.

As shown in FIG. 1, the backlight module 1 includes a light guide plate 10, the light emitter 12, and a wavelength converter 14. The light guide plate 10 of the backlight module 1 has an incident surface 100a that is located at a side of the light guide plate 10. The light emitter 12 of the backlight module 1 is disposed at the side of the light guide plate 10 and corresponds in position to the incident surface 100a. The light emitter 12 of the backlight module 1 includes the base 120 and a light source 122. The base 120 of the light emitter 12 includes two clamping arms 120a. The clamping arms 120a of the base 120 are respectively located at two sides of the base 120, as shown in FIG. 1. The clamping arms 120a of the base 120 substantially extend toward the light guide plate 10. The light source 122 of the emitter 12 is disposed on the base 120 and between the clamping arms 120a. The wavelength converter 14 of the backlight module 1 is located between the incident surface 100a of the light guide plate 10 and the light source 122 of the light emitter 12, and is clamped by the clamping arms 120a of the base 120.

In the embodiment, the wavelength converter 14 of the backlight module 1 has an exit surface 142, and the exit surface 142 faces the incident surface 100a of the light guide plate 100. Each of the clamping arms 120a of the base 120 includes an abutting portion 120b and a hook portion 120c. The abutting portions 120b of the clamping arms 120a substantially extend toward light guide plate 10 for respectively abutting against the upper sidewall and the lower sidewall of the wavelength converter 14, as shown in FIG. 1. Each of the hook portions 120c of the clamping arms 120 is connected to the corresponding abutting portion 120b and extends toward a location between the wavelength converter 14 and the light guide plate 10. The inner side of each of the hook portions 120c (i.e., the side thereof that substantially faces away from the light guide plate 10) hooks onto the exit surface 142 of the wavelength converter 14.

It can be seen that the mounting method between the light emitter 12 and the wavelength converter 14 involves directly clamping the wavelength converter 14 using the clamping arms 120a formed on the base 120, so that it is unnecessary to apply an adhesive between the light emitter 12 and the wavelength converter 14. Therefore, problems associated with overflowing of the adhesive can be avoided.

In addition, in the embodiment, in addition to hooking onto the exit surface 142 of the wavelength converter 14, the hook portions 120c of the clamping arms 120a can also respectively abut against the upper edge and lower edge of the incident surface 100a of the light guide plate 100. Therefore, when the wavelength converter 14 (i.e., the exit surface 142 thereof) is adhered to the incident surface 100a of the light guide plate 10 by an adhesive 2, the adhesive 2 also adheres to the hook portions 120c of the clamping arms 120a of the base 120, so that the mounting strength between the wavelength converter 14 and the light guide plate 10 can be enhanced. Furthermore, the adhesive 2 between the wavelength converter 14 and the light guide plate 10 can be blocked by the hook portions 120c of the clamping arms 120a, so as to prevent the adhesive 2 from overflowing onto the upper surface and the lower surface of the light guide plate 10 and thereby adversely affect the optical performance and the assembly of the backlight module 1. In an embodiment, the adhesive 2 can be a LOCA, but the invention is not limited in this regard.

As shown in FIG. 1, in order to improve assembly between the light guide plate 10 and the light emitter 12 of the backlight module 1, the light guide plate 10 of the backlight module 1 further includes engaging portions 100b. The engaging portions 100b are respectively located at the upper edge and the lower edge of the incident surface 100a. Therefore, the engaging portions 100b of the light guide plate 10 can respectively abut against the outer sides of the hook portions 120c of the clamping arms 120a. Furthermore, each of the hook portions 120c of the clamping arms 120a includes a guiding surface 120d. Each of the guiding surfaces 120d has a slope substantially inclined outward in a direction away from the base 120. That is, the guiding surfaces 120d of the hook portions 120c are respectively inclined toward the upper edge and the lower edge of the incident surface 100a of the light guide plate 10 in a direction away from the light source 122, as shown in FIG. 1. Each of the engaging portions 100b of the light guide plate 10 includes an inclined surface 100c for abutting against the corresponding guiding surface 120d.

Through the foregoing configuration, the adhesive 2 applied to the exit surface 142 of the wavelength converter 14 is extruded by the incident surface 100a of the light guide plate 10 and guided by the guiding surfaces 120d of the hook portions 120a and the inclined surfaces 100c of the light guide plate 10 when the light guide plate 10 of the backlight module 1 is assembled on the light emitter 12, so as to flow toward the center of the exit surface 142 of the wavelength converter 14. In addition, when the hook portions 120c of the clamping arm 120a and the engaging portions 100b of the light guide plate 10 abut against each other, the guiding surfaces 120d of the hook portions 120a and the inclined surfaces 100c of the light guide plate 10 increase the distance by which the adhesive 2 must travel to reach the upper surface and the lower surface of the light guide plate 10, making it difficult for the adhesive 2 to flow to the upper surface and the lower surface of the light guide plate 10. Accordingly, compared with a configuration that does not include the guiding surfaces 120d of the hook portions 120c and the inclined surfaces 100c of the light guide plate 10, the inclusion of the guiding surfaces 120d of the hook portions 120c and the inclined surfaces 100c of the light guide plate 10 and the abutting together of these elements are such that the possibility of overflowing of the adhesive 2 onto the upper surface and the lower surface of the light guide plate 10 is reduced.

Moreover, when the wavelength converter 14 is assembled to the base 120 of the light emitter 12, the wavelength converter 14 is pushed onto the hook portions 120c of the clamping arms 120a in a direction toward the light source 122, so as to make the abutting portions 120b of the clamping arms 120a deform outwardly in a direction away from the light source 122. After the wavelength converter 14 passes over the hook portions 120c of the clamping arms 120a, the abutting portions 120b of the clamping arms 120a return to their original position to abut against the sidewalls of the wavelength converter 14, and the inner side of the hook portions 120c of the clamping arms 120a hook onto the exit surface 142 of the wavelength converter 142 that faces away from the light source 122. By respectively forming the guiding surfaces 120d on the hook portions 120c of the clamping arms 120a, the wavelength converter 14 can be guided by the guiding surfaces 120d to smoothly pass over the hook portions 120c of the clamping arms 120a while being pushed in a direction toward the light source 122.

Figure 2A:
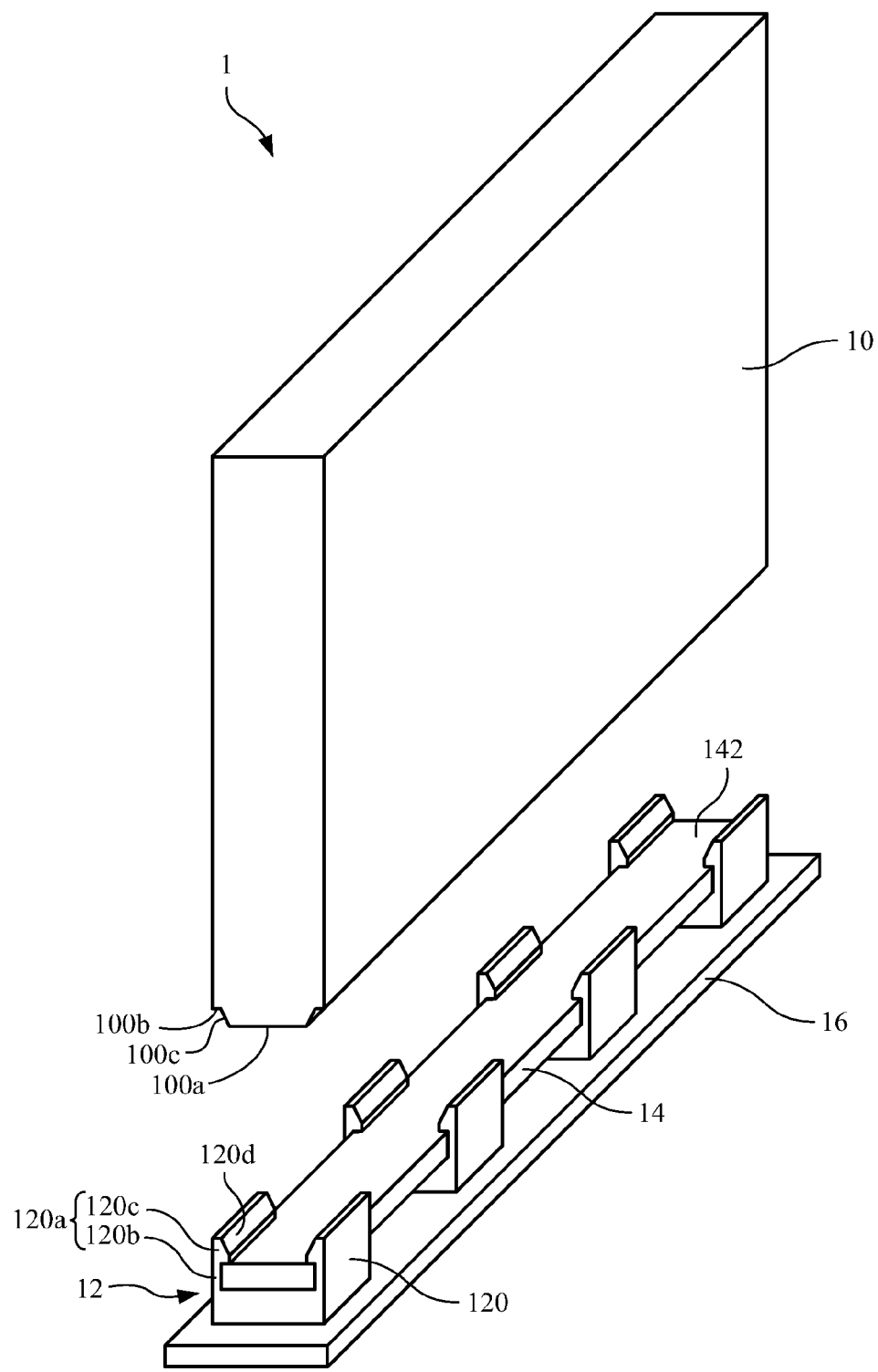
FIG. 2A is a perspective view of the components of the backlight module in FIG. 1 according to an embodiment, in which a light guide plate is shown in a state prior to being abutted against light emitters.

FIG. 2A is a perspective view of the components of the backlight module 1 in FIG. 1 according to an embodiment, in which the light guide plate 10 is shown in a state prior to being abutted against light emitters 12.

As shown in FIG. 2A, the wavelength converter 14 of the backlight module 1 is substantially strip-shaped, and the boundary of the wavelength converter 14 is substantially aligned to the boundary of the incident surface 100a of the light guide plate 10 in a direction perpendicular to the incident surface 100a. The backlight module 1 further includes a circuit board 16. In the embodiment, the backlight module 1 includes a plurality of light emitters 12. There are four light emitters 12 included in the backlight module 1 as shown in FIG. 2A, but the invention is not limited in this regard. Each of the light emitters 12 is electrically connected to the circuit board 16. The light emitters 12 are disposed along the wavelength converter 14 in a spaced-apart manner, so that the wavelength converter 14 is located between the incident surface 100a of the light guide plate 10 and any one of the light emitters 12. Therefore, the incident surface 100a of the light guide plate 10 that is assembled onto the light emitters 12, the wavelength converter 14, and the hook portions 120c can be adhered to each other after the adhesive 2 is applied between the wavelength converter 14 and the hook portions 120c. Moreover, the adhesive 2 can be prevented from overflowing onto the upper surface and the lower surface of the light guide plate 10. In the embodiment, each of the bases 120 of the light emitters 12 on the circuit board 16 includes the clamping arms 120a for clamping the wavelength converter 14, but the invention is not limited in this regard.

Figure 2B:
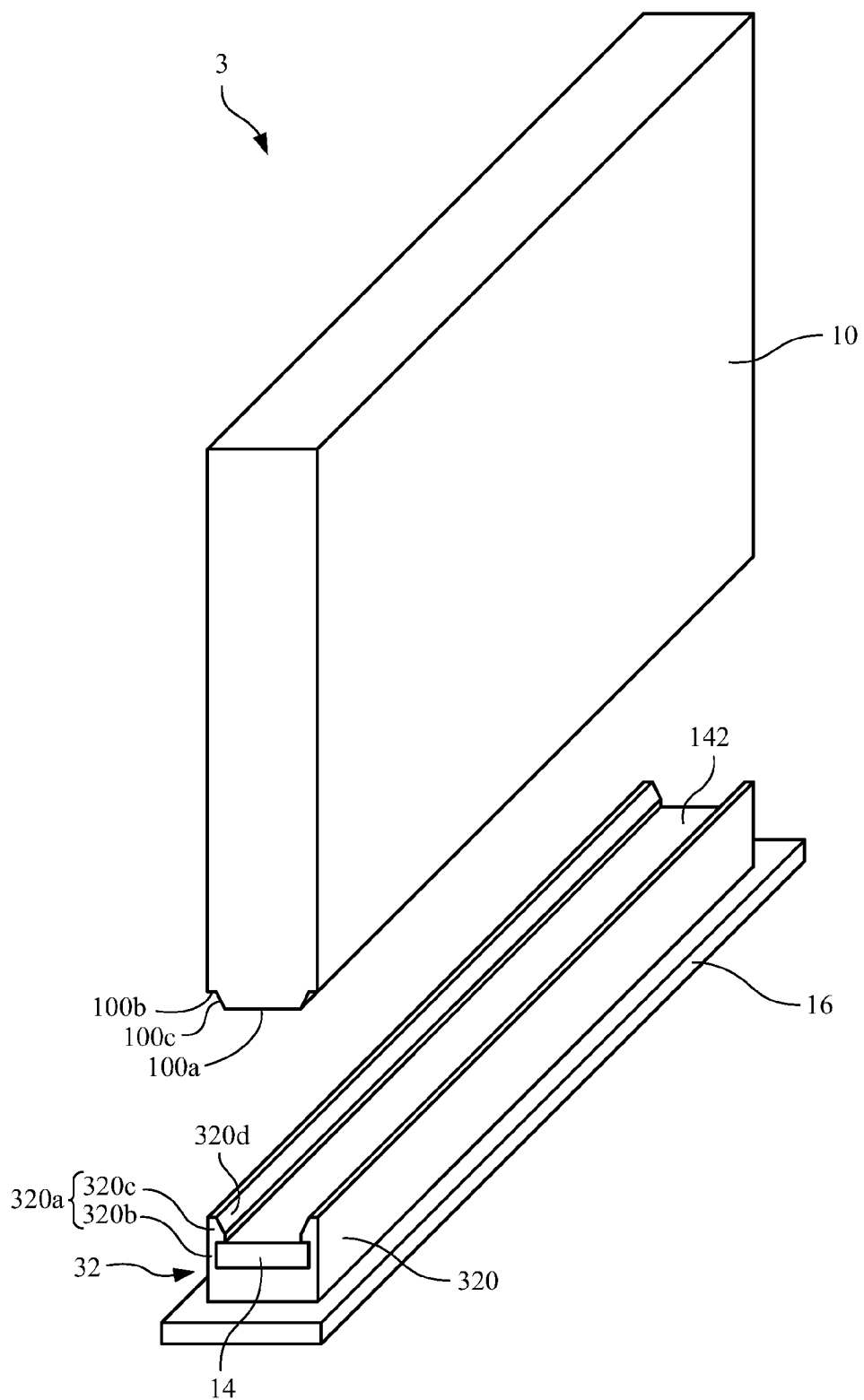
FIG. 2B is a perspective view of the components of the backlight module in FIG. 1 according to another embodiment, in which a light guide plate is shown in a state prior to being abutted against a light emitter.

FIG. 2B is a perspective view of the components of the backlight module 1 in FIG. 1 according to another embodiment, in which the light guide plate 10 is shown in a state prior to being abutted against a light emitter 32.

As shown in FIG. 2B, in this embodiment, the backlight module 3 includes the light emitter 32 having a single long base 320. The base 320 of the light emitter 32 of the backlight module 3 can be imagined as being formed by connecting the bases 120 of all of the light emitters 12 in FIG. 2A. The light emitter 32 is electrically connected to a circuit board 16. That is, a light source (not shown) of the light emitter 32 is disposed on the base 320 that is strip-shaped similar to the wavelength converter 14. Similarly, clamping arms 320a of the base 320 and abutting portions 320b, hook portions 320c, and guiding surfaces 320d of the clamping arms 320a are also extended to be formed as long, strip-shaped elements. Therefore, after the adhesive 2 is applied between the wavelength converter 14 and the hook portions 320c, the area that the adhesive is applied among the incident surface 100a of the light guide plate 10, the exit surface 142 of the wavelength converter 14, and the hook portions 320c is larger than that of the former embodiment in FIG. 2A. Accordingly, not only can the embodiment prevent the adhesive 2 from overflowing onto the upper surface and the lower surface of the light guide plate 10, but also the mounting strength among the light guide plate 10, the light emitter 32, and the wavelength converter 14 can be further enhanced.

Figure 3:
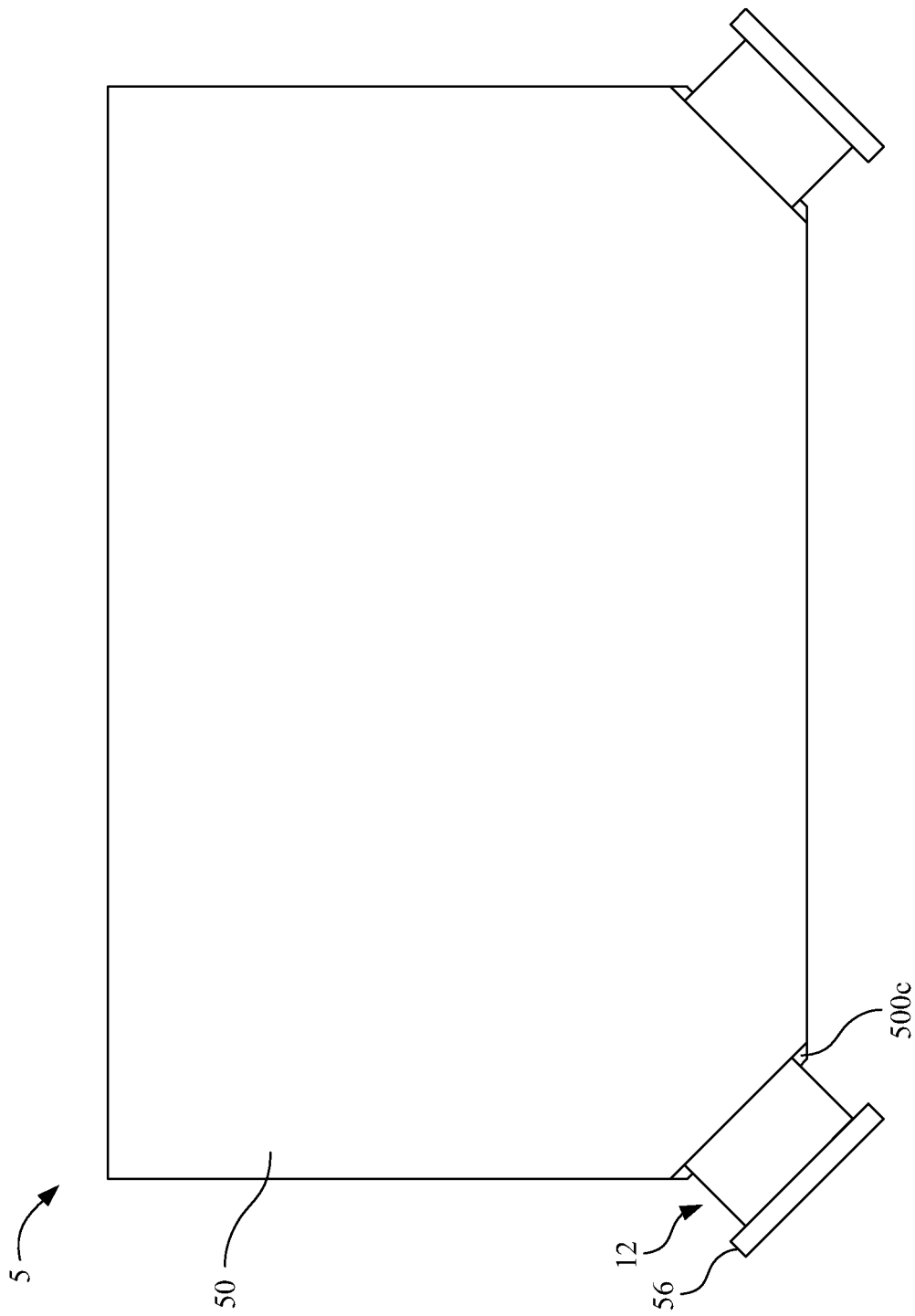
FIG. 3 is a top view of some components of a backlight module according to another embodiment of the invention.

FIG. 3 is a top view of some components of a backlight module 5 according to another embodiment of the invention.

As shown in FIG. 3, the bottom-left corner and the bottom-right corner of a light guide plate 50 of the backlight module 5 respectively abut against two light emitters 12. That is, two inclined surfaces 500c are respectively formed at the bottom-left corner and the bottom-right corner of the light guide plate 50 for respectively abutting against the light emitters 12. Compared with the backlight module 1 in FIG. 2A, a circuit board 56 used in the backlight module 5 of the embodiment for electrically connecting to the light emitters 12 can be shorter, and the quantity of the light emitters 12 that are required can be reduced. With this configuration, the light emitters 12 disposed at the bottom-left corner and the bottom-right corner of the light guide plate 50 emit light toward the center of the light guide plate 50, and together with the use of a reflector (not shown) that is optically designed to reflect the light, the backlight module 5 generates uniform planar light.

As shown in FIG. 1 to FIG. 2B, a wavelength converting material is packaged in the wavelength converter 14, and the wavelength converting material has nanocrystals 140 included therein. In some embodiments, the nanocrystals 140 packaged in the wavelength converter 14 can be stimulated to emit red light and green light, and the light sources 122 of the light emitters 12 can emit blue light. Because blue light has a high level of energy, the nanocrystals 140 can be stimulated to emit red light and green light when the blue light enters the wavelength converter 14, so as to mix to form white light which is subsequently emitted out of the exit surface 142 of the wavelength converter 14. However, the invention is not limited in this regard, that is, with respect to the colors of light emitted by the nanocrystals 140 and the light sources 122 of the light emitters 12.

Figure 4:
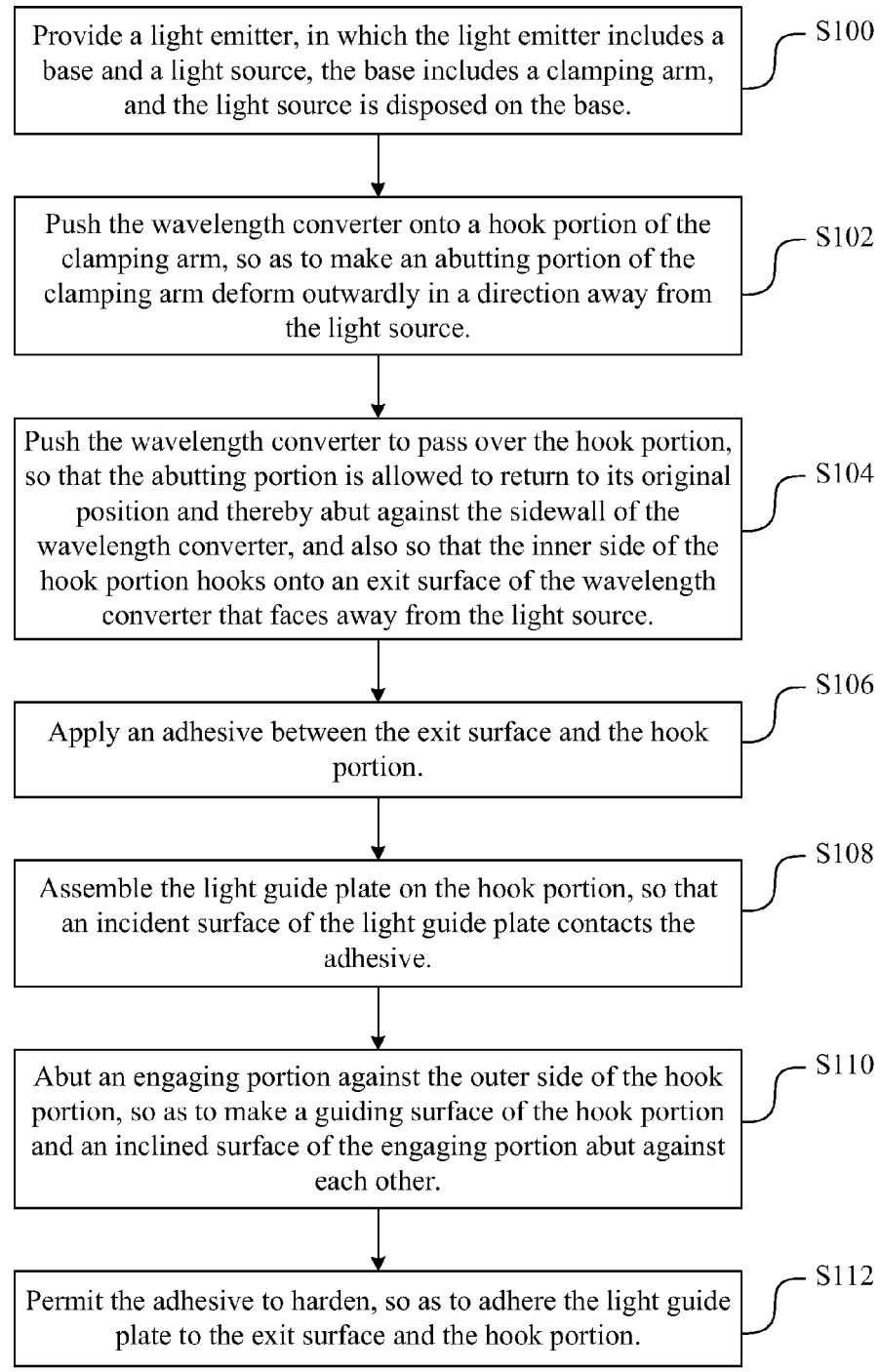
FIG. 4 is a flow chart illustrating a backlight module assembling method according to an embodiment of the invention.

FIG. 4 is a flow chart illustrating a backlight module assembling method according to an embodiment of the invention.

As shown in FIG. 4, the backlight module assembling method includes the steps as outlined below.

In step S100, a light emitter is provided, in which the light emitter includes a base and a light source, the base includes a clamping arm, and the light source is disposed on the base.

In step S102, the wavelength converter is pushed onto a hook portion of the clamping arm, so as to make an abutting portion of the clamping arm deform outwardly in a direction away from the light source.

In step S104, the wavelength converter is pushed to pass over the hook portion, so that the abutting portion is allowed to return to its original position and thereby abut against the sidewall of the wavelength converter, and also so that the inner side of the hook portion hooks onto an exit surface of the wavelength converter that faces away from the light source.

In step S106, an adhesive is applied between the exit surface and the hook portion.

In step S108, the light guide plate is assembled on the hook portion, so that an incident surface of the light guide plate contacts the adhesive.

In step S110, an engaging portion is abutted against the outer side of the hook portion, so as to make a guiding surface of the hook portion and an inclined surface of the engaging portion abut against each other.

In step S112, the adhesive is permitted to harden, so as to adhere the light guide plate to the exit surface and the hook portion.

According to the foregoing recitations of the embodiments of the invention, it can be seen that a light emitter of the backlight module includes a particularly designed clamping arm formed on a base thereof. The clamping arm of the base can be used to clamp a wavelength converter, so the light emitter and the wavelength converter can be mounted to each other without the use of an adhesive (e.g., a LOCA) to thereby solve the problem of overflowing of the adhesive. In addition, when the wavelength converter is adhered to a side of a light guide plate of the backlight module by using a LOCA, the LOCA also adheres to the clamping arm that clamps the wavelength converter, so as to enhance the mounting strength between the wavelength converter and the light guide plate. Furthermore, engaging structures are respectively disposed on the clamping arm of the base and the light guide plate, so the LOCA between the wavelength converter and the light guide plate can be blocked by the clamping arm when the base of the light emitter abuts against the light guide plate, so as to prevent the LOCA from overflowing onto the upper surface and the lower surface of the light guide plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module comprising:
   a light guide plate having an incident surface;
   at least one light emitter disposed at a side of the light guide plate and corresponding in position to the incident surface, the light emitter comprising:
      a base;
      a clamping arm integrally extended from the base and substantially extending toward the light guide plate, the clamping arm comprising an abutting portion and a hook portion connected to the abutting portion; and
      a light source disposed on the base;
   a wavelength converter located between the light guide plate and the light source and clamped by the clamping arm, the wavelength converter having an exit surface facing the incident surface, wherein the abutting portion substantially extends toward light guide plate for abutting against a sidewall of the wavelength converter, the hook portion extends toward a location between the wavelength converter and the light guide plate, and the inner side of the hook portion hooks onto the exit surface; and
   an adhesive applied to the exit surface, the light guide plate, and the hook portion.

2. The backlight module of claim 1, wherein the light guide plate further comprises an engaging portion located at the edge of the incident surface, and the engaging portion abuts against the outer side of the hook portion.

3. The backlight module of claim 2, wherein the hook portion comprises a guiding surface, the guiding surface has a slope substantially inclined outward in a direction away from the base, the engaging portion comprises an inclined surface, and the guiding surface and the inclined surface abut against each other.

4. The backlight module of claim 1, wherein the light emitter is disposed at a corner of the light guide plate.

5. The backlight module of claim 1, wherein the wavelength converter is substantially strip-shaped, the boundary of the wavelength converter is substantially aligned to the boundary of the incident surface in a direction perpendicular to the incident surface, and a plurality of the light emitters are disposed along the wavelength converter in a spaced-apart manner, so that the wavelength converter is located between the incident surface and any one of the light emitters.

6. The backlight module of claim 1, wherein a wavelength converting material is packaged in the wavelength converter, and the wavelength converting material has nanocrystals included therein.

7. The backlight module of claim 6, wherein the light emitter emits blue light.

8. A backlight module assembling method comprising the steps of:

providing a light emitter, wherein the light emitter comprises a base, a clamping arm, and a light source, the clamping arm is integrally extended from the base, the clamping arm comprises an abutting portion and a hook portion, the abutting portion is connected between the base and the hook portion, and the light source is disposed on the base;

assembling a wavelength converter on the base, so as to make the clamping arm clamp the wavelength converter;

applying an adhesive between the hook portion and an exit surface of the wavelength converter that faces away from the light source;

assembling the light guide on the hook portion, so that an incident surface of the light guide plate contacts the adhesive; and permitting the adhesive to harden, so as to adhere the light guide plate to the exit surface and the hook portion, so that the wavelength converter is located between the light guide plate and the light source.

9. The backlight module assembling method of claim 8, wherein the step of assembling the wavelength converter toward the base further comprises the steps of:

pushing the wavelength converter onto the hook portion, so as to make the abutting portion deform outwardly in a direction away from the light source; and pushing the wavelength converter to pass over the hook portion, so that the abutting portion is allowed to return to its original position and thereby abut against the sidewall of the wavelength converter, and also so that the inner side of the hook portion hooks onto the exit surface.

10. The backlight module assembling method of claim 9, wherein the hook portion hooks onto the edge of the exit surface, the hook portion comprises a guiding surface, the guiding surface has a slope substantially inclined outward in a direction away from the base, the light guide plate further comprises an incident surface and an engaging portion, the engaging portion is located at the edge of the incident surface, the engaging portion comprises an inclined surface, and the step of assembling the light guide plate to the clamping arm comprises a step of:

abutting the engaging portion against the outer side of the hook portion, so as to make the guiding surface and the inclined surface abut against each other.

11. The backlight module assembling method of claim 8, wherein a wavelength converting material is packaged in the wavelength converter, and the wavelength converting material has nanocrystals included therein.

* * * * *